(12) United States Patent
Sütthoff et al.

(10) Patent No.: US 8,328,137 B2
(45) Date of Patent: Dec. 11, 2012

(54) EMERGENCY EXIT HATCH FOR EXITING A CABIN MODULE IN AN EMERGENCY AND ENTERING THE SAME

(75) Inventors: Thomas Sütthoff, Hamburg (DE); Alexander Stendel, Hamburg (DE)

(73) Assignee: Airbus Operations GmbH (DE)

( * ) Notice: Subject to any disclaimer, the term of this patent is extended or adjusted under 35 U.S.C. 154(b) by 258 days.

(21) Appl. No.: 12/740,403

(22) PCT Filed: Oct. 21, 2008

(86) PCT No.: PCT/EP2008/064203
§ 371 (c)(1),
(2), (4) Date: Jun. 11, 2010

(87) PCT Pub. No.: WO2009/056476
PCT Pub. Date: May 7, 2009

(65) Prior Publication Data
US 2010/0252679 A1   Oct. 7, 2010

Related U.S. Application Data

(60) Provisional application No. 60/000,951, filed on Oct. 30, 2007.

(30) Foreign Application Priority Data

Oct. 30, 2007   (DE) .......................... 10 2007 051 802

(51) Int. Cl.
 *B64C 1/14*   (2006.01)
(52) U.S. Cl. .................................. 244/129.5; 244/118.5
(58) Field of Classification Search .... 244/129.4–129.6, 244/118.5; 49/254, 258, 259; 52/127.8; 296/216.02–216.04, 219, 221, 222
See application file for complete search history.

(56) References Cited

U.S. PATENT DOCUMENTS

| | | | |
|---|---|---|---|
| 1,694,662 A * | 12/1928 | Nicles ............................. | 49/152 |
| 2,312,155 A | 2/1943 | Flaxman | |
| 2,396,508 A | 3/1946 | Heffner et al. | |
| 3,676,954 A | 7/1972 | Rapport et al. | |
| 4,412,404 A | 11/1983 | Manning | |
| 4,415,197 A | 11/1983 | Meyer | |
| 4,519,645 A | 5/1985 | Kelly et al. | |
| 5,137,327 A | 8/1992 | Edmonds et al. | |
| 5,255,479 A | 10/1993 | Shepherd | |
| 5,826,624 A | 10/1998 | Graser | |
| 6,003,813 A | 12/1999 | Wentland et al. | |
| 6,189,833 B1 * | 2/2001 | Ambrose et al. ........... | 244/129.5 |
| 6,341,748 B1 | 1/2002 | Brooks et al. | |

(Continued)

FOREIGN PATENT DOCUMENTS

CA   2411528 A1   5/2003

(Continued)

*Primary Examiner* — Tien Dinh
*Assistant Examiner* — Nicholas McFall
(74) *Attorney, Agent, or Firm* — Lerner, David, Littenberg, Krumholz & Mentlik, LLP (57) ABSTRACT

The invention relates to an emergency exit hatch for exiting a cabin module for an aircraft in an emergency and entering the cabin module. Said emergency exit hatch comprises a first mechanism for visually inspecting a zone below the emergency exit hatch by at least partly opening the emergency exit hatch by means of the first mechanism, and a second mechanism for entirely opening the emergency exit hatch. The first mechanism is not the same as the second mechanism.

15 Claims, 7 Drawing Sheets

U.S. PATENT DOCUMENTS

| | | |
|---|---|---|
| 6,427,383 B1 | 8/2002 | Brooks et al. |
| 6,572,182 B2 | 6/2003 | Lamparter et al. |
| 6,609,750 B1 | 8/2003 | Cauduro |
| 6,771,181 B1 * | 8/2004 | Hughen, Jr. ................ 340/693.5 |
| 2003/0019976 A1 | 1/2003 | Cheung |
| 2005/0230542 A1 | 10/2005 | Farnsworth |
| 2007/0125909 A1 | 6/2007 | Seiersen et al. |
| 2009/0084039 A1 | 4/2009 | Guering et al. |
| 2009/0289146 A1 | 11/2009 | Gauggel et al. |
| 2010/0059625 A1 | 3/2010 | Saint-Jalmes et al. |
| 2010/0140407 A1 * | 6/2010 | Pujol et al. ................ 244/129.5 |
| 2012/0012704 A1 | 1/2012 | Mosler et al. |

FOREIGN PATENT DOCUMENTS

| | | |
|---|---|---|
| DE | 102007019341 A1 | 11/2008 |
| DE | 102007035681 A1 | 2/2009 |
| DE | 102007051802 A1 | 5/2009 |
| DE | 102009005905 A1 | 8/2010 |
| EP | 0259886 A2 | 3/1988 |
| EP | 0565249 A1 | 10/1993 |
| EP | 0901962 A2 | 3/1999 |
| GB | 2386146 A | 9/2003 |
| JP | 11-247543 A | 9/1999 |
| WO | 2006134242 A2 | 12/2006 |

* cited by examiner

EMERGENCY EXIT HATCH FOR EXITING A CABIN MODULE IN AN EMERGENCY AND ENTERING THE SAME

CROSS-REFERENCE TO RELATED APPLICATIONS

This application is a national phase entry under 35 U.S.C. §371 of International Application No. PCT/EP2008/064203, filed Oct. 12, 2008, published in German, which claims the benefit of the filing date of U.S. Provisional Patent Application No. 61/000,951 filed on Oct. 30, 2007 and German Patent Application No. 10 2007 051 802.3 filed on Oct. 30, 2007, the disclosures of which are hereby incorporated herein by reference.

FIELD OF THE INVENTION

The present invention pertains to the technical field of emergency exit hatches. The present invention specifically pertains to an emergency exit hatch in an accommodation module in an aircraft, a method for actuating an emergency exit hatch, an aircraft with a corresponding emergency exit hatch and the utilization of a corresponding emergency exit hatch in an aircraft.

TECHNICAL BACKGROUND

Rest compartments (accommodation compartments) for the crew (crew) of an aircraft are also referred to as Crew Rest Compartments (CRC) or, if provided for use by the flight crew (flight crew), FCRC and form part of the prescribed mandatory equipment of aircraft on long-duration flights. According to international standards, one reclining accommodation is required for flights with a flight time between 8 h and 14 h and two reclining accommodations are required for flights with a flight time of more than 14 h.

Conventional CRC and FCRC are realized with reclining options, work and rest stations in various combinations and spatial orientations, for example, in the ceiling area or crown area of the aircraft, i.e., above the area that is accessible to passengers. In this case, the compartments are referred to as overhead compartments.

In order to reach this area of the compartments from the main deck of an aircraft, climbing aids such as stairs with corresponding stairwells are provided. If an in-flight emergency situation arises, in which a user needs to quickly and safely escape from the compartment, the utilization of an emergency exit hatch is indispensable.

In this context, one basic problem can be seen in that only a confined installation space can be made available for these compartments and therefore also the emergency exits situated therein because the space in an aircraft is limited.

In order to realize sufficient and safe headroom, particularly in the upper passenger area, the dimensions and installation volumes of the compartments are frequently minimized in many areas.

Known solutions of emergency exit hatches have a significant installation height that directly affects the headroom in the passenger area and the comfort in the compartments. This can cause an additional weight component in the aircraft.

It is furthermore required to provide other options for accessing or entering such compartments, e.g., overhead compartments. The reason for this can be seen in that the aircraft may, after a possible accident, be deformed in such a way that it is no longer possible to conventionally exit the compartment via the provided stairs or the conventional exit area and crew members could become trapped in the compartment.

Emergency hatches known so far are also in need of improvement with respect to the fact that the actuation of an emergency exit by unauthorized persons is prevented and only authorized persons can operate and use the mechanism.

DISCLOSURE OF THE INVENTION

It is an objective of the invention to disclose an improved emergency exit hatch for exiting and entering an accommodation (rest compartment) module of an aircraft in an emergency.

According to the present invention, an emergency exit hatch for exiting an accommodation module for an aircraft in an emergency and for entering the accommodation module, as well as a method for actuating an emergency exit hatch, the utilization of an emergency exit hatch in an aircraft, a rest compartment module with an emergency exit hatch and an aircraft with an emergency exit hatch are disclosed.

In the context of the present invention, the term accommodation module refers to any resting room or rest area for the crew of an aircraft that may be situated at any location in an aircraft. For example, an accommodation module designed for the flight crew may be arranged directly behind the cockpit, but a compartment for the cabin crew may also be integrated into the passenger area on the main deck and, for example, in the ceiling area (crown area), wherein it is furthermore possible to realize a compartment with an emergency exit hatch in the so-called lower deck area, i.e., on the cargo deck level. In this case, the term accommodation module includes a resting room for the crew, in which the crew can sleep, work as well as rest. The terms crew rest compartment, flight crew rest compartment and overhead compartment are synonymous with the term accommodation module in any case.

According to an exemplary embodiment of the present invention, an emergency exit hatch for exiting an accommodation module for an aircraft in an emergency and for entering the accommodation module is disclosed. In this case, the emergency exit hatch features a first mechanism for a visual inspection of an area underneath the emergency exit hatch by at least partially opening the emergency exit hatch with the aid of the first mechanism. The emergency exit hatch furthermore features a second mechanism for completely opening the emergency exit hatch, wherein the first mechanism is not the same as the second mechanism.

The inventive first mechanism therefore enables the user of the emergency exit hatch to prevent personal injuries and property damages when the emergency exit hatch is in fact completely opened. The visual inspection of an area underneath the emergency exit hatch realized with the aid of the first mechanism ensures that no persons or objects that could be injured or damaged due to the exit of a crew member are located in this area.

The term "area underneath the exit hatch" refers to the area, over which the mechanical effect of the emergency exit hatch and all its mechanical devices extends. This may mean, for example, that a hinge mechanism swings into a passenger area situated underneath an overhead compartment when the emergency exit hatch in this overhead compartment is completely opened, wherein it should therefore be possible to subject this particular passenger area to a visual inspection from above. In other words, it is possible to visually inspect the area, in which the mechanism of the hatch could cause personal injuries. Consequently, this visual inspection realized by partially opening the emergency exit hatch with the aid of the first mechanism makes it possible to examine this entire area and the user can visually determine whether or not it is safe to actuate the second mechanism in order to completely open the hatch. In this case, the area situated underneath the hatch may also consist of another rest compartment module, in which other crew members may possibly be located.

In this case, it is quite possible that this visual inspection is realized entirely by partially opening the emergency exit hatch with the aid of the first mechanism. In an example, in which the first mechanism represents a sliding mechanism, it may suffice for the user to produce, for example, a small gap by sliding open the first mechanism in order to visually inspect the entire hazardous area thereunder, in which persons or objects to be protected may possibly be located.

In this case, the concept that forms the basis of the invention is realized with two different mechanisms. In this exemplary embodiment of the present invention, this means that both mechanisms are operable and functional independently of one another. Consequently, each of the two mechanisms can be operated at any time and in any condition of the other respective mechanism.

Due to the advantageous design of the present invention, an emergency exit hatch is disclosed that not only makes it possible to exit in an emergency, but also to enter from an area outside the module and therefore to enter the module through the emergency exit hatch. This may be of vital importance in a variety of hazardous situations, for example, after the aircraft is deformed in such a way that the conventional stairs or the conventional access to the module is no longer usable. The inventive design of the emergency exit hatch with two independent and dissimilar mechanisms ensures that the functionality of the hatch is preserved in case of such a deformation. For example, the first mechanism that is designed for partially opening the emergency exit hatch may make it possible to open the hatch to such an extent that it is possible to exit in a particular emergency, in which the second mechanism is no longer functional. In addition to the advantages described so far, it is another advantage of the inventive emergency exit hatch to provide two mechanisms, the individual actuation of which also makes it possible to open the hatch in such a way that the user can exit and enter.

According to another exemplary embodiment of the present invention, the first and the second mechanism can be actuated from inside the module and the first and the second mechanism can also be actuated from outside the module.

In addition to a visual inspection from the module and into the module, this inventive design of the two mechanisms also makes it possible to enter the module from outside through the emergency exit hatch. This inventive option of entering a rest compartment module through the emergency exit hatch provides significant safety advantages in hazardous situations. For example, in an emergency situation, in which unconscious crew members are still located in the module, a rescue can be realized from outside by opening the emergency exit hatch. This is particularly important in instances, in which the normal exit is no longer usable or even destroyed.

For example, in situations that require a spatial connection between the areas inside the module and outside the module, this exemplary inventive embodiment makes it possible to produce this connection from both sides.

According to another exemplary embodiment of the present invention, the first mechanism allows a visual inspection of the rest compartment module from a lower-lying area.

This lower-lying area therefore may be the area underneath the emergency exit hatch if the hatch is used in an overhead compartment. In this case, the crucial point with respect to the two terms "area underneath the emergency exit hatch" and "lower-lying area" is that they refer to the area, in which the moving mechanism of the hatch could cause injuries or damages, as well as the area, in which persons may want to look into the module from outside while the emergency exit hatch is partially opened or completely opened. This can be used for discovering and rescuing persons or objects that are still located in the module. However, the first mechanism is also designed for the sole purpose of producing a spatial connection that makes it possible, for example, to exchange objects between the areas inside the module and outside the module.

According to another exemplary embodiment of the present invention, the first mechanism is a mechanism that is selected from the group consisting of sliding mechanisms, sliding mechanisms with a rigid sliding unit, sliding mechanisms with several movable sliding units, sliding mechanisms with lamellae and sliding mechanisms with an individual rotatable blade.

One exemplary design of the first inventive mechanism is a sliding mechanism. However, since the main function of the first inventive mechanism merely consists of partially opening the emergency exit hatch, this may also refer to any mechanism that realizes this opening. An example that is described further below and illustrated in the figures features a sliding mechanism with a rigid sliding unit that is displaced as an individual element into a pocket provided for this purpose and simultaneously releases an opening of the emergency exit hatch. However, this may likewise refer to a sliding mechanism with several movable sliding units that can be rolled up, for example, similar to a roller blind. It would furthermore be conceivable to use lamellar sliding mechanisms that are all arranged in a parallel and elongated fashion in the closed state, wherein the individual lamellae line up and, although they remain connected, point inward and outward with their edges when the sliding mechanism is opened. It would furthermore be possible to use a sliding mechanism with an individual rotatable blade, wherein the rotation of this individual blade ensures the partial opening of the emergency exit hatch such that a visual inspection can be carried out. In this case, the individual blade rotates, for example, about its longitudinal axis that is oriented, for example, perpendicular to the direction of displacement of the first mechanism. This is comparable, for example, to the lamellae of Venetian blinds, in which at least one individual lamella is rotatable independently of the others.

According to another exemplary embodiment of the present invention, the second mechanism of the emergency exit hatch is a hinge mechanism.

In order to ensure the fastest possible complete opening of the emergency exit hatch in an emergency, it is possible to use a hinge mechanism that completely opens the emergency exit hatch, for example, due to gravitation. However, the hinge mechanism may also feature an additional drive, for example, a spring or other mechanic, electronic, pneumatic and hydraulic driving means.

If the exit is freely accessible after a visual inspection and no persons are injured if the hatch is completely opened, the hinge mechanism can be activated, for example, by turning a handle that is provided for this purpose and releases a locking bolt. Such a hinge mechanism is anchored, for example, in the frame of the emergency exit hatch by means of a pin with corresponding bearings and makes it possible to pivot the part of the hinge mechanism that covers and seals the entire opening of the hatch about this pin.

According to another exemplary embodiment of the present invention, the second mechanism of the emergency exit hatch can be actuated regardless of a state of the first mechanism.

In order to ensure a complete functional separation of the two mechanisms, the mechanisms are designed in such a way that a potential impairment of one of the two mechanisms does not affect the other respective mechanism. For example, if the first mechanism is damaged, the user can still completely open the emergency exit hatch in an emergency, but a visual inspection with the aid of the first mechanism is no longer possible. Vice versa, if the function of the second mechanism is impaired, the user can exit the hatch, for example, by producing a sufficiently large opening with the aid of the first mechanism.

However, it would also be conceivable that the first mechanism is a sliding mechanism that can be locked and secured in different positions, wherein the second mechanism can be pivoted open regardless of the different positions of the first mechanism.

According to another exemplary embodiment of the present invention, the emergency exit hatch furthermore features an access clearance device in order to realize a controlled access to the rest compartment module and/or in order to realize a controlled exit from the rest compartment module.

This access clearance device therefore makes it possible to only allow authorized persons to open the hatch in such a way and to such an extent that entering and exiting is possible, namely from inside the module as well as from outside the module. Consequently, unauthorized persons can be prevented, for example, from entering and accessing the module from the passenger area through the emergency exit hatch.

This device may be realized, for example, in the form of a keypad, a mechanical or electromechanical lock, a biometric data acquisition system, a voice recognition system or a combination lock.

According to another exemplary embodiment of the present invention, the access clearance device of the emergency exit hatch is selected from the group consisting of electronic keypad, mechanical keypad and electromechanical keypad.

Access to the module can be granted to authorized users of the emergency exit hatch with the aid of such a keypad, namely from inside as well as from outside the module. This obstacle can be eliminated with additional measures for a special emergency such that it is no longer required to operate this device. For example, two electromagnetic keypads or keyboards used for this purpose may be arranged on the sliding unit of the first mechanism, namely one for inside and one for outside the module.

According to another exemplary embodiment of the present invention, the emergency exit hatch additionally features an element that simplifies exiting and entering.

In order to ensure that, for example, a rest compartment can also be entered through the emergency exit hatch in contrast to conventional solutions of emergency exit hatches, certain elements that simplify exiting and entering are arranged on the hatch or in the immediate vicinity of the hatch. Consequently, it is possible to provide special steps or handles that respectively make it easier for the user to climb through a possibly narrow gap or the completely opened emergency exit hatch. Since it is usually necessary to overcome a certain height difference during this process, it needs to be ensured that particularly hardwearing and slip-resistant materials are used for this purpose.

According to another exemplary embodiment of the present invention, the element that simplifies exiting and entering is selected from the group consisting of steps, fold-out steps, seat backrests, seating surfaces, footboards, handles and handrails.

The emergency exit hatch may be arranged directly above the seat rows of the passenger area. In order to allow entering or exiting in this area, additional platforms are arranged on the surrounding seats, wherein the seat backrests, the seating surfaces, the armrests or other fold-out steps can also be used as platforms. These elements simplify the access to the module situated vertically on top thereof through the emergency exit hatch. However, additional handles in the ceiling area can also be used as elements that simplify exiting and entering.

A step that can be folded in and out and is arranged on the vertical outer wall of the compartment is another possible device that simplifies exiting and entering. Furthermore, additional handles are provided in the interior of the module such that the entering or exiting user can steady himself and hold on.

According to another exemplary embodiment of the present invention, the emergency exit hatch is designed for being arranged between a ceiling of a passenger area and a crown area.

In a first variation, the emergency exit hatch therefore does not form part of the so-called ceiling or the ceiling in the passenger area, but rather is situated between this ceiling and the so-called crown area. Consequently, a so-called decorative panel that is incorporated into the passenger ceiling, i.e., the ceiling, is situated underneath the emergency exit or the emergency exit hatch, respectively.

This exemplary design of the present invention may be interesting, for example, for a flight crew rest compartment because no persons are usually present in the area underneath a decorative panel in the ceiling in this case and a decorative panel that falls down during the required removal thereof does not cause any personal injuries or property damages.

However, this does not exclude embodiments, in which the inventive emergency exit hatch directly forms part of the ceiling such that no decorative panel exists between the emergency exit hatch and the passenger area and the emergency exit hatch therefore is incorporated into the ceiling of the passenger area, directly accessible and not optically or mechanically protected by another layer. This exemplary variation of the emergency exit hatch is realized, for example, in a crew rest compartment located in the rear part of the aircraft.

According to another exemplary embodiment of the present invention, a method for actuating an emergency exit hatch for exiting a rest compartment module for an aircraft in an emergency and for entering the rest compartment module is disclosed, wherein the method features the following steps: actuating a first mechanism, inspecting whether it is possible to actuate a second mechanism and actuating a second mechanism in order to completely open the hatch, wherein the first mechanism is not the same as the second mechanism.

In the inventive method that makes it possible to exit and to enter a rest compartment module, possible injuries or damages caused by the actuation of the second mechanism can be prevented. The inspection as to the fact whether it is possible to actuate the second mechanism therefore includes inspecting whether the actuation of the second mechanism may result in personal injuries and property damages due to the mechanics and function of the second mechanism. In an emergency, the user of the inventive method therefore is able to enter and to exit the module without causing injuries or damages.

In order to ensure a completely independent function of the two mechanisms in any case, the two mechanisms 1 and 2 do not correspond by 100%. In case one mechanism is damaged, this ensures that the other respective mechanism can still remain functional.

In this case, the function of the method for actuating an emergency exit hatch in order to exit a compartment can be described in an exemplary fashion with the following actions: lifting a handle and disengaging a locking bolt by means of a turning motion, pushing the hatch panel into the pocket with the aid of the handle, engaging a lock in a position, in which the hatch remains half-open, inspecting the clearance of the exit, actuating the handle in order to completely open the hatch and exiting the hatch by utilizing, for example, seat backrests and seating surfaces. In this respect, it is important that the sequence of these steps may by all means vary in accordance with the other exemplary embodiments.

According to another exemplary embodiment of the present invention, the inventive method furthermore features the following steps: lifting a handle, disengaging a locking device and engaging a locking device.

For example, in order to transfer a sliding unit from its closed position into an at least partially opened position, this state can be initiated for the visual inspection, for example, by means of a handle and the disengagement of an optional locking device. Subsequently, the sliding unit can be locked or secured by means of a locking device such that the sliding unit no longer moves during the possible subsequent complete opening of the hatch, for example, with the aid of a hinge mechanism.

According to another exemplary embodiment of the present invention, the method features the following step: removing a decorative panel.

In this context, removing refers to the safe removal of a decorative panel, wherein this takes into account that a falling structural component or decorative panel could possibly injure passengers located thereunder. In this case, the removal can be realized, for example, in the form of sliding, striking, pulling, pushing, bending and pressing. One important aspect in this respect is that a sufficiently large space is made available in order to enable the entering or exiting user to pass through.

The decorative panel may be arranged on the cabin side and removed from there or from inside the module.

According to another exemplary embodiment of the present invention, the method additionally features the following step: utilizing an exiting or entering aid from the group consisting of steps, fold-out steps, seat backrests, seating surfaces, footboards, handles and handrails.

If the emergency exit hatch is located, for example, above passenger seats, the utilization of climbing or exiting aids is indispensable. These may be realized, for example, in the form of platforms that ensure a particularly safe foothold while vertically entering the module situated on top thereof. For example, armrests or backrests that are specially designed for this purpose consequently are particularly suitable in this respect.

According to another exemplary embodiment of the present invention, the method additionally features the following steps: actuating an access clearance device in order to realize a controlled access to the rest compartment module and/or in order to realize a controlled exit from the rest compartment module.

In this case, the three following variations of access clearance devices may be considered: only one device that can be operated from outside the module, one device that can be operated from outside and from inside the module and a device that can only be operated from inside the module. In the variation, in which the device can only be operated from outside, it is therefore possible to prevent unauthorized persons from accessing the module. An actuation from inside the module is not possible in this case and also undesirable because the inventive method needs to be carried out as quickly as possible in an emergency.

This step may be realized, for example, in the form of the actuation of a keypad that requests a certain code from the user in order to check the user's authorization.

According to another exemplary embodiment of the present invention, the utilization of an emergency exit hatch of an exemplary embodiment of the present invention in an aircraft is disclosed.

According to another exemplary embodiment, a rest compartment module for an aircraft with an emergency exit hatch of an exemplary embodiment of the present invention is disclosed.

According to another exemplary embodiment of the present invention, an aircraft with an emergency exit hatch of one of the preceding exemplary embodiments is disclosed.

In addition to a small installation volume, a low weight due to the utilization of new materials or preventing the access of unauthorized persons by means of electrical or electromechanical access clearance devices, the following advantages should also be mentioned: compliance with strict safety requirements due to the option of visually assessing the opposite side, as well as low maintenance expenditures due to effective and simple mechanics, easy entering and exiting and minimal effect on the volumetric capacity of the overhead stowage compartment.

Other exemplary embodiments and advantages of the invention result from the following description of the figures.

The illustrations in the figures are schematic and not true-to-scale.

Preferred exemplary embodiments of the present invention are described below with reference to the figures.

In the following description of the figures, the same reference symbols are used for identical or similar elements.

Figure 1:
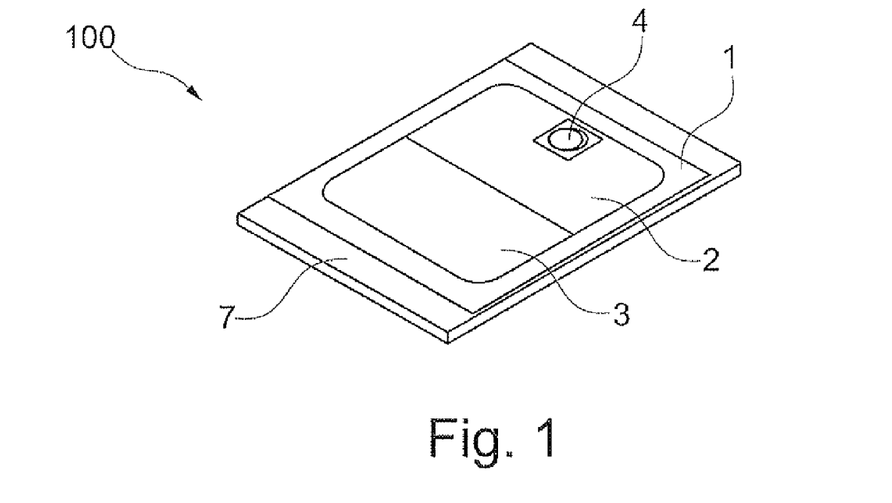
FIG. 1 to FIG. 5 shows a schematic three-dimensional representation of the inventive emergency exit hatch according to an exemplary embodiment of the present invention.

FIG. 1 shows an exemplary embodiment of an emergency exit hatch 100 according to the present invention. The inventive emergency exit hatch features a frame 1, in which the hatch panel/sliding element or sliding unit 2 is located in such a way that the hatch panel can be displaced into a stowage compartment provided for this purpose or a so-called pocket 3 by actuating the first mechanism with the aid of the handle 4. This figure also shows the surrounding material of the emergency exit hatch 7 that is incorporated into the inventive emergency exit hatch 100. In FIG. 1, the emergency exit hatch is illustrated in a completely closed situation, in which the first mechanism and the second mechanism that form the basis of the inventive concept are completely closed.

Figure 2:
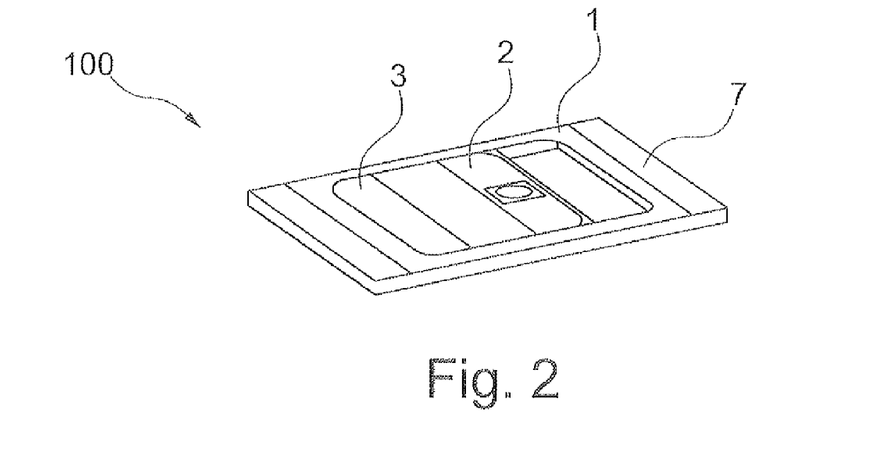

FIG. 2, in contrast, shows the inventive emergency exit hatch 100 in a half-open position, in which the sliding unit 2 releases a partial opening of the emergency exit hatch and is partially pushed into the stowage compartment or the pocket 3, respectively. This partial opening of the emergency exit hatch makes it possible to visually inspect the outside of the module from inside the module or the inside of the module from outside the module. The module, in which the emergency exit hatch is installed, is not illustrated in this figure.

Figure 3:
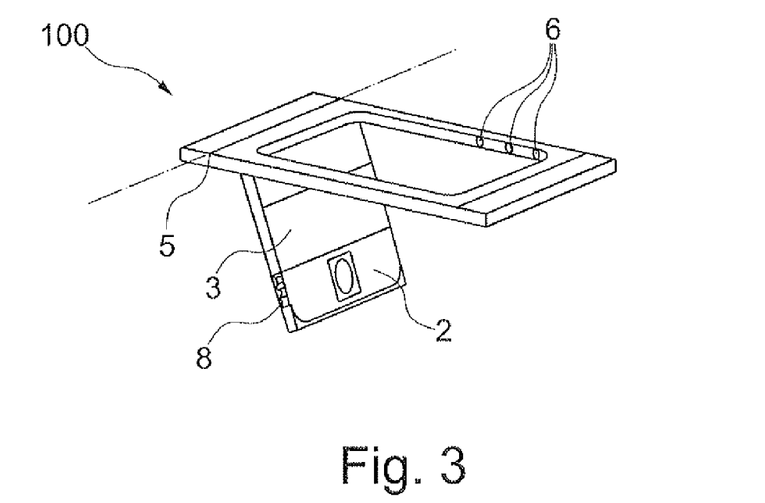

FIG. 3 shows an exemplary embodiment of the inventive emergency exit hatch 100 in the state after the actuation of the second mechanism in order to completely open the emergency exit hatch. In this case, the second mechanism is illustrated in the form of a hinge for a hinge mechanism 5 and ensures that the entire unit including the hatch panel or sliding unit and the pocket situated adjacent thereto pivots out of the frame of the emergency exit hatch. Furthermore, two bushings 6 are illustrated, in which a bolt 8 can be locked that is shown on the end of a guide in this figure. In this case, the two bushings 6 shown mark the two positions half-open (left bushing) and closed (right bushing). This figure clearly shows that the first mechanism and the second mechanism are dissimilar and that a visual inspection of an area underneath the emergency exit hatch can be realized by at least partially opening the emergency exit hatch with the aid of the first mechanism. In this exemplary embodiment, the area underneath the emergency exit hatch refers to the area, into which the door of the hinge mechanism pivots, i.e., the area in which the door is located in the state shown. This example clearly shows that a potential hazard is created in this area because the pivoting door with the elements 2, 3, 8 and 5 can cause personal injuries and property damages.

Figure 4:
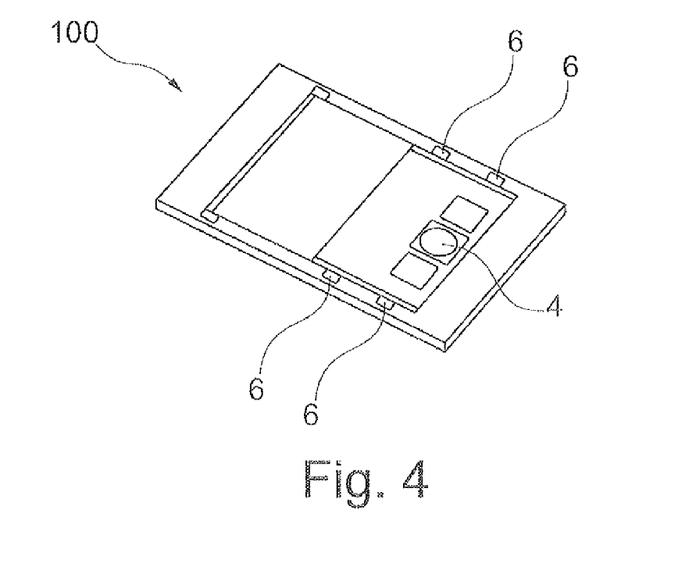

FIG. 4 shows an inventive emergency exit hatch 1 in the closed state, wherein the four bushings 6 shown are intended for locking the sliding element or sliding unit, respectively. This figure furthermore shows a handle 4 that makes it possible to actuate the sliding mechanism or, in general terms, the first mechanism.

Figure 5:
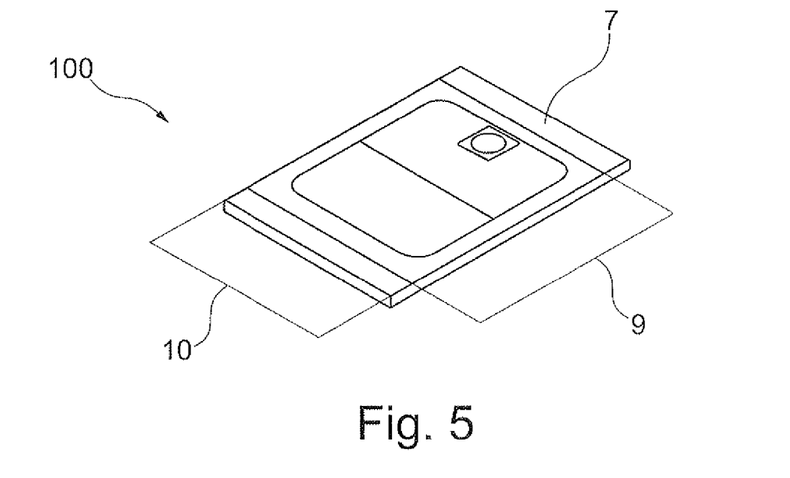

FIG. 5 shows an inventive emergency exit hatch in the closed state with the surrounding material of the emergency exit hatch 7 and exemplary dimensions, i.e., the depth and the width of the emergency exit hatch. In this case, the depth 9 is indicated, for example, in a range between 550-750 mm while the width 10 of the emergency exit hatch may lie, for example, in a range between 300-500 mm.

These dimensions result from the minimal requirements of the hatch with respect to the human anatomy. According to various studies, the dimensions may be based on the following: shoulder width: 532 mm, chest depth: 282 mm, diagonal: 602,12 mm.

In another study, a dimensional range of X: 580-690 mm, Y: 330-410 mm and D: 667-802 mm is described, wherein X represents the depth, Y represents the width and D represents the diagonal in this case.

With consideration of the emergency equipment to be carried along, i.e., all objects that the exiting user would like to carry along in an emergency, an appropriate dimensional range of the hatch is hereby claimed.

In this context, it should be explicitly noted that all dimensional indications provided describe a special exemplary embodiment of the present invention and do not necessarily lie in the aforementioned range.

Figure 6:
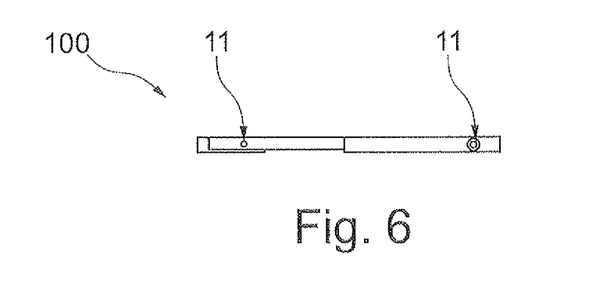
FIG. 6 shows a schematic two-dimensional representation of the inventive emergency exit hatch in the form of a side view.

FIG. 6 shows an inventive emergency exit hatch 100 in the form of a side view. The constructive design of the inventive emergency exit hatch makes it possible to realize the smallest possible installation height. With consideration of this aspect, the emergency hatch only slightly exceeds the normal sandwich panel thickness of, e.g., 2.54 cm (1 inch). In this context, an emergency hatch is an emergency exit hatch according to the present invention. This makes it possible, for example, to increase the height of the actual compartment and therefore the headroom and the comfort within the compartment.

For example, the structural depth of the pocket, into which the sliding panel is pushed in order to realize the visual inspection of the opposite side, may amount to 29.4 mm. The structural depth in the region of the handle may amount, for example, to 31.4 mm, wherein this may take into account the locking mechanism and the optional keypad.

These are also merely optional dimensions that may be different in other exemplary embodiments.

In order to achieve a very low weight, the following materials are used, for example, for the following parts of the emergency exit hatch: the frame may consist of aluminum and the sliding panel or the sliding unit may consist of decorative material, a honeycomb core, a core filler mass or reinforcing bushings. The pocket may consist, for example, of CFRP and the handle and the opposite electromagnetic keypad or keyboard, as well as the hinge pins, may consist of aluminum or titanium. The bushing and the guide may consist of aluminum while the bolt may once again consist of titanium. This makes it possible, for example, to achieve a maximum weight of 6.5 kg.

Figure 7:
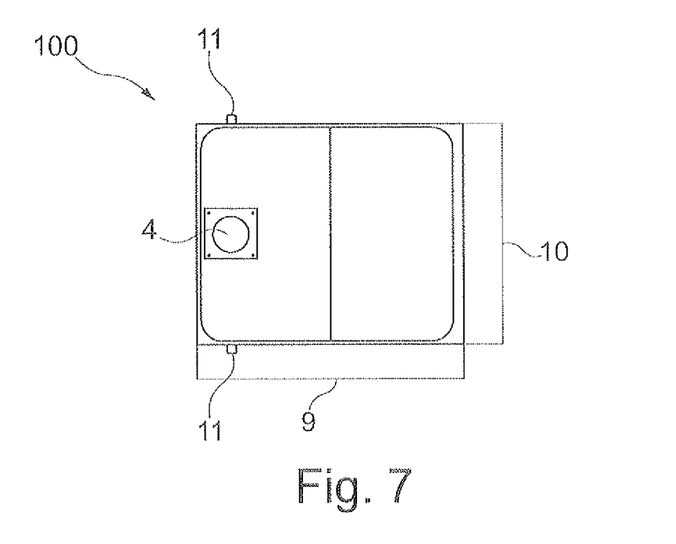
FIGS. 7 and 8 shows a schematic two-dimensional representation of the inventive emergency exit hatch according to an exemplary embodiment of the present invention.

FIG. 7 shows an exemplary embodiment of the inventive emergency exit hatch 7, in which the handle 4 and the bolt 11 are illustrated in the form of a top view and the depth 9 of the emergency exit hatch and the depth and width 10 of the emergency exit hatch are indicated. For example, the depth may be 532 mm and the width may be 444 mm.

Figure 8:
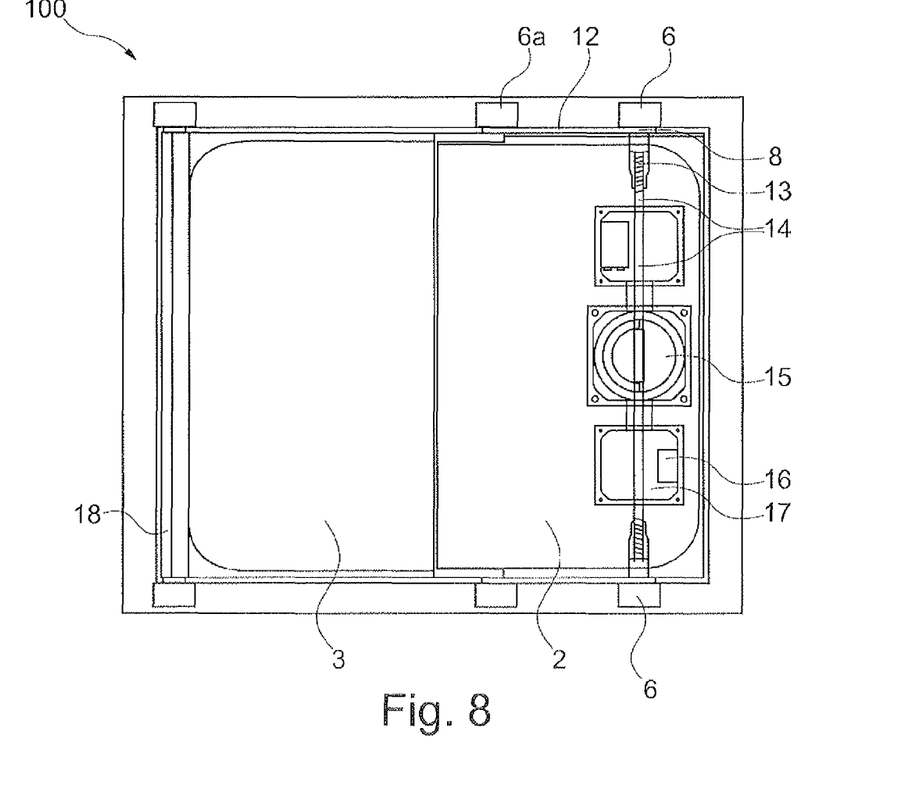

FIG. 8 shows an exemplary embodiment of the present invention, in which both mechanisms are illustrated in detail. This figure shows the bushings 6, into which the bolt 8 can engage that is illustrated on the end of the guide 12 in this case. This engagement is realized by means of the spring 13 that moves the bolt away from the joint rod 14 such that it can engage in the locking devices. This joint rod 14 can be actuated with a bracket or a handle 15 and therefore makes it possible to disengage the locking device in this closed position and to partially open the emergency exit hatch with the aid of this first mechanism. The sliding element or the sliding unit 2 is displaced into the pocket 3 in the guide 12 in this case. It can then be locked in the bushing 6a and secured in a partially opened state at a later time. Subsequently, the second mechanism can be actuated that pivots out the entire inner unit about a pin 18 as shown in FIG. 3. This figure furthermore shows a maintenance panel 17 with a battery 16 provided for an access clearance device in the form of a keypad. This keypad may be installed, for example, from the outside in order to only grant authorized persons access to the emergency exit hatch.

The steps described below elucidate the function of the inventive emergency exit hatch, as well as the entering or exiting into/from a compartment, wherein said steps do not necessarily have to be carried out chronologically: lifting a handle and disengaging a locking bolt by means of a turning motion, pushing the hatch panel or the sliding unit into the pocket with the aid of the handle, engaging a lock in the position of the bushing 6a and, if applicable, removing a decorative panel on the cabin side through the thusly created opening of the emergency exit hatch, carrying out a visual inspection of the desired outer or inner area, actuating a handle in order to completely open the emergency exit hatch and subsequently exiting the hatch by utilizing exiting or entering aids and actuating a keypad and a handle in order to completely open the hatch.

This detailed description of the figures clearly shows that the second mechanism, in this case a hinge mechanism, is realized independently of the first mechanism, in this case a sliding mechanism.

Figure 9:
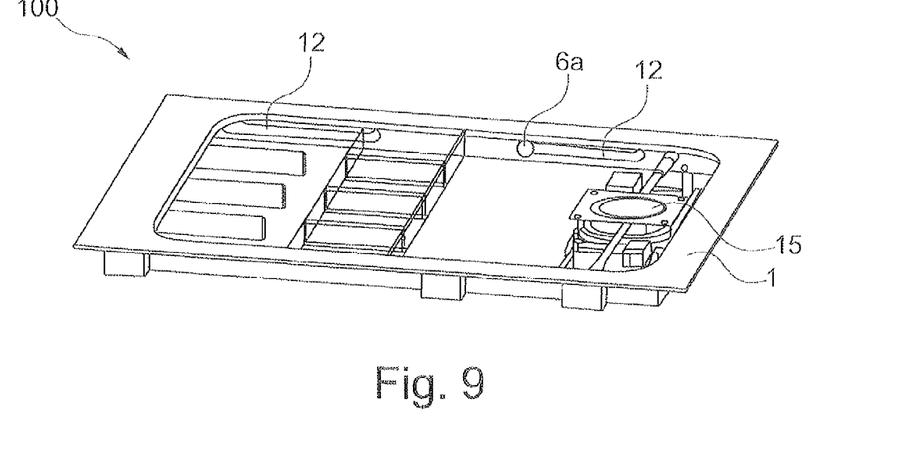
FIG. 9 shows a schematic three-dimensional representation of the inventive emergency exit hatch according to an exemplary embodiment of the present invention.

FIG. 9 shows an exemplary embodiment of the inventive emergency exit hatch 100, in which the frame of the emergency exit hatch 100 with the guide 12 is illustrated, wherein an optional sliding mechanism can move in said guide. The bushing between the locking device 6a is also clearly illustrated. This figure furthermore shows the bracket or handle 15 that is connected to the joint rod 14 and therefore the opening or closing and locking mechanism.

Figure 10:
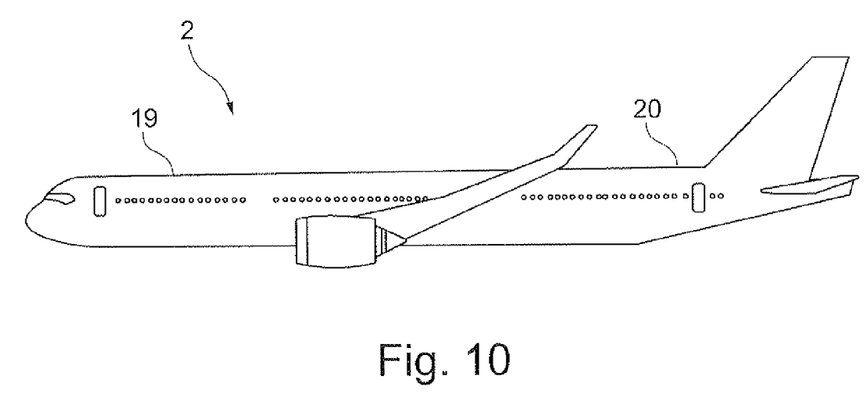
FIG. 10 shows a schematic three-dimensional representation of an aircraft according to an exemplary embodiment of the present invention.

FIG. 10 shows an aircraft that contains a flight crew rest compartment 19 in the front area and provides a crew rest compartment in the rear area. However, this figure does not exclude embodiments, in which a FCRC and a CRC are arranged at other locations of the aircraft, namely on the main deck, as well as in the cargo area situated thereunder or directly underneath the cockpit.

Figure 11:
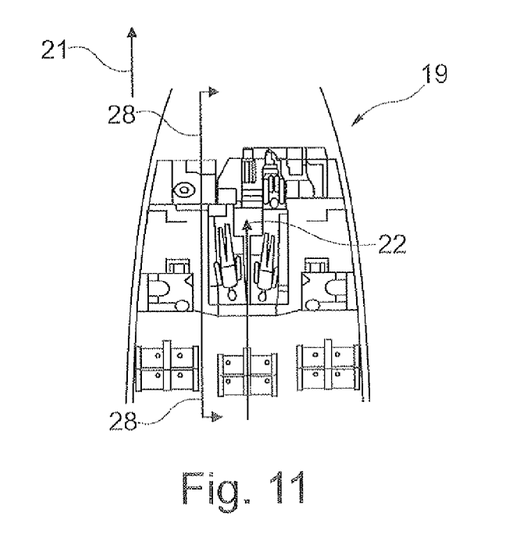
FIG. 11 shows a schematic two-dimensional representation of the inventive emergency exit hatch according to an exemplary embodiment of the present invention.

FIG. 11 shows a top view into an exemplary rest compartment module with an emergency exit hatch according to the present invention. In this case, the emergency exit hatch 22 is positioned between two beds of this compartment. The two arrows 28 indicate a possible escape direction after exiting the compartment through the emergency exit hatch. The reference symbol 21 indicates the flight direction of the aircraft.

Figure 12:
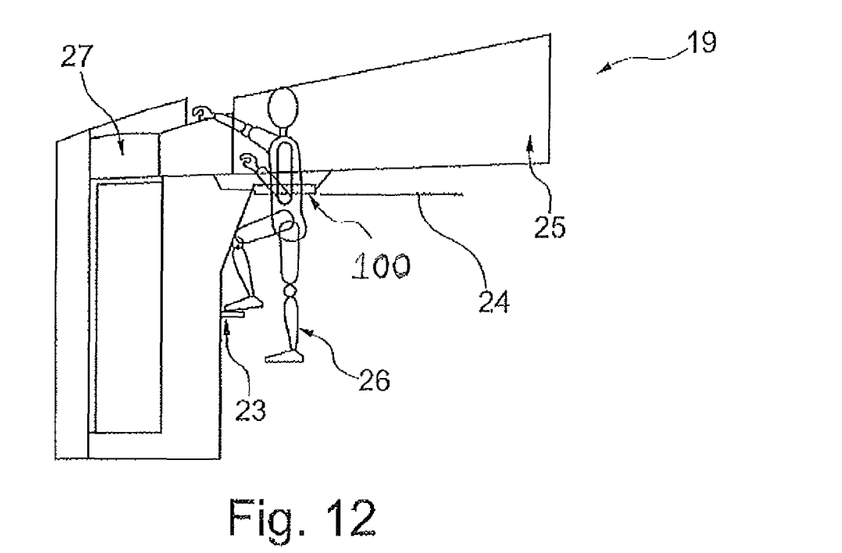
FIG. 12 shows a schematic three-dimensional representation of the inventive emergency exit hatch in a compartment according to an exemplary embodiment of the present invention.

FIG. 12 shows a rest compartment module 19 with an emergency exit hatch 100 according to one exemplary embodiment of the present invention. This figure shows an exemplary FCRC, i.e., a module for the flight crew, into/from which a crew member 26 currently enters or exits, respectively. One can clearly see that access from the lower main deck area into the crown area is made possible by means of the exiting and entering aid 23 that is realized in the form of an exemplary fold-out step in this figure. The reference symbol 27 identifies the position of the normal entrance and exit, for example stairs. In case of a possible deformation of these stairs 27, it is possible to enter or exit the exemplary compartment shown through the emergency exit hatch 100 and trapped persons can be rescued from the module. A sleeping accommodation 25 that is situated above the ceiling line in the aisle area 24 is also illustrated. According to this exemplary figure, the emergency exit hatch 100 is situated at a slightly different height than the ceiling line in the aisle area 24. It is clearly offset from this ceiling line in order to show that a mounting point for the emergency exit hatch exists between the ceiling and the crown area and that a not-shown decorative panel is situated underneath the emergency exit hatch as part of the ceiling line or the ceiling, respectively. This figure also clearly shows that no passenger seats are situated in the area underneath the emergency exit hatch such that the removal of an optional decorative panel cannot cause any personal injuries or property damages.

Figure 13A:
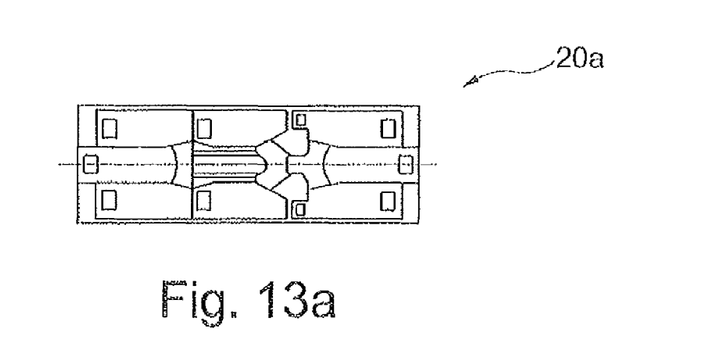
FIGS. 13a and 13b show a schematic two-dimensional representation of the inventive emergency exit hatch according to an exemplary embodiment of the present invention.
Figure 13B:
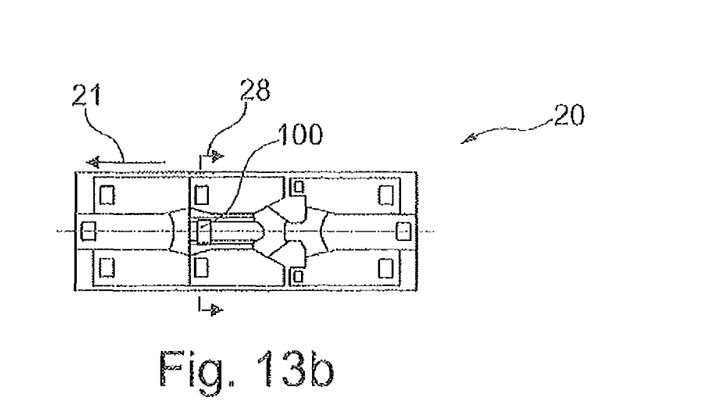

FIGS. 13a and 13b both show a rest compartment module for the cabin crew. FIG. 13A shows no emergency exit hatch within the module 20a, but 13B shows a module 20 with such a hatch that is identified by the reference symbol 100. The arrows indicate a possible escape direction from the module in an emergency.

Figure 14:
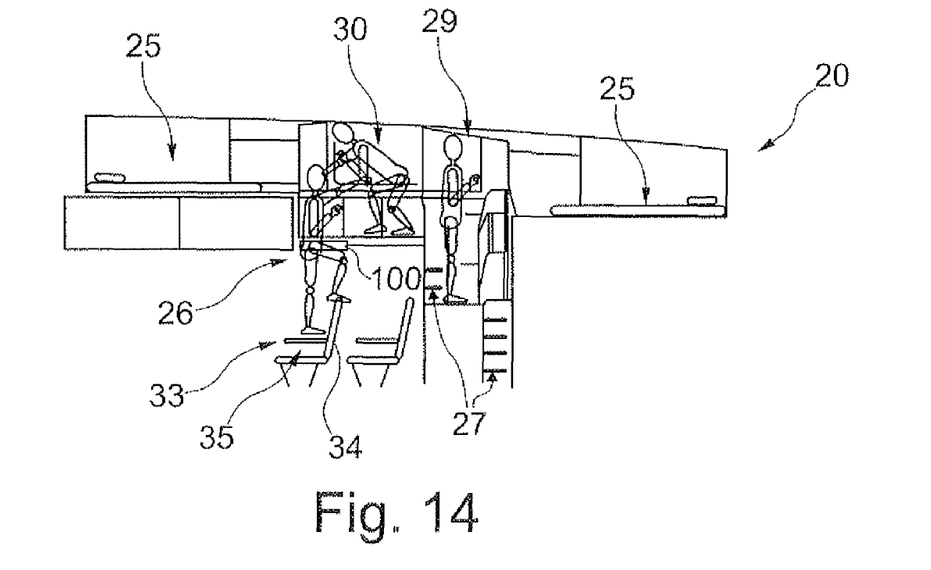
FIG. 14 shows a schematic three-dimensional representation of the inventive emergency exit hatch according to an exemplary embodiment of the present invention.

FIG. 14 shows a rest compartment module 20 with exit hatch for the cabin crew. In this case, the position 27 of the normal exit is illustrated in the form of stairs and clearly differs from the position of the emergency exit hatch 100. The transition area 29 of at least head height is situated between the areas to the right and the left thereof, in which several sleeping accommodations 25 are provided. There also is an area, in which a person can only spend time in a crouched position, i.e., this area has a reduced head height. This is the area 30. This figure also clearly shows how an entering or exiting crew member 26 copes with the vertical height to be overcome by utilizing the exiting and entering aids. In this case, the crew member utilizes additional elements such as an additional step as entering aid or a backrest or seating surface as entering aid. This figure furthermore clearly shows that the emergency exit hatch is situated above the passenger area and therefore above seated passengers, which is why no decorative panel is arranged underneath the exit hatch in this embodiment. This decorative panel could cause personal injuries or property damages when it falls down while exiting or entering the hatch.

Figure 15:
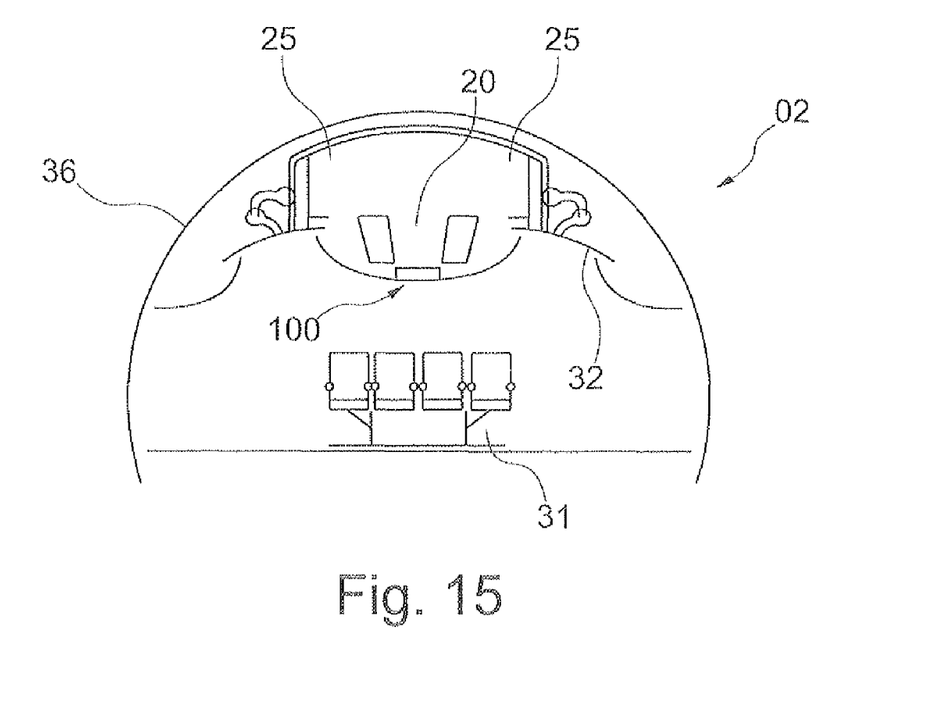
FIG. 15 shows a schematic two-dimensional representation of the inventive emergency exit hatch according to an exemplary embodiment of the present invention.

FIG. 15 shows a cross section through an aircraft fuselage 36 with a rest compartment module 20 that contains an emergency exit hatch 100. The ceiling line 32 shown represents the ceiling of the passenger area. This figure also clearly shows that the emergency exit hatch 100 is arranged above seats in the passenger area 31 and therefore may be realized, for example, as part of the ceiling. A not-shown decorative panel is not provided in this case. Several berths and sleeping accommodations 25 are illustrated in this figure.

As a supplement, it should be noted that "comprising" does not exclude other elements or steps, and that "an" or "a" does not exclude a plurality. It should furthermore be noted that characteristics or steps that were described with reference to one of the above exemplary embodiments can also be used in combination with other characteristics or steps of other above-described exemplary embodiments. Reference symbols in the claims should not be interpreted in a restrictive sense.

LIST OF REFERENCE SYMBOLS

100 Emergency exit hatch
02 Aircraft with rest compartment module featuring emergency exit hatch
1 Frame of emergency exit hatch
2 Hatch panel/sliding unit
3 Pocket/stowage space for hatch panel
4 Handle
5 Hinge for hinge mechanism
6 Bushing
6a Bushing between locking device
7 Surrounding material of emergency exit hatch
8 Bolt on end of guide
9 Depth of emergency exit hatch
10 Width of emergency exit hatch
11 Bolts/guide pins 12 Guide
13 Spring
14 Joint rod
15 Bracket/handle
16 Battery (keypad)
17 Maintenance panel
18 Pin
19 Rest compartment module with emergency exit hatch for pilots (FCRC)
20 Rest compartment module with emergency exit hatch for cabin crew (CRC)
20a Rest compartment module without emergency exit hatch for cabin crew (CRC)
21 Flight direction
22 Position of emergency exit hatch in a FCRC
23 Exiting and entering aid
24 Ceiling line in aisle area
25 Berth/sleeping accommodations
26 Entering crew member
27 Position of normal entrance and exit
28 Possible escape direction from module in an emergency
29 Transition area with at least head height
30 Area with walk/catwalk
31 Seats in passenger area
32 Ceiling line
33 Entering aid in the form of an additional step/armrest of seat
34 Entering aid in the form of a backrest
35 Entering aid in the form of a seating surface
36 Aircraft fuselage

The invention claimed is:

1. An aircraft comprising:
a passenger cabin;
a cockpit; and
a crew rest compartment comprising an emergency exit hatch arranged in a floor of the crew rest compartment and configured for allowing an exit from the crew rest compartment through the floor thereof and into the passenger cabin or the cockpit and for allowing an entry into the crew rest compartment from the passenger cabin or the cockpit,
wherein the emergency exit hatch comprises:
a first mechanism for allowing visual inspection of an area underneath the emergency exit hatch by at least partially opening the emergency exit hatch with the aid of the first mechanism; and
a second mechanism for completely opening the emergency exit hatch;
wherein the first mechanism is not the same as the second mechanism, and
wherein the first mechanism is a mechanism selected from the group consisting of sliding mechanisms, sliding mechanisms with a rigid sliding unit, sliding mechanisms with a plurality of movable sliding units, sliding mechanisms with lamellae and sliding mechanisms with an individual rotatable blade.

2. The emergency exit hatch of claim 1,
wherein the first and the second mechanisms are actuable from inside the module; and
wherein the first and the second mechanisms are actuable from outside the module.

3. The emergency exit hatch of claim 1,
wherein the first mechanism allows visual inspection into the accommodation module from a lower-lying area.

4. The emergency exit hatch of claim 1,
wherein the second mechanism is a hinge mechanism.

5. The emergency exit hatch of claim 1,
wherein the second mechanism is actuable regardless of a state of the first mechanism.

6. The emergency exit hatch of claim 1, further comprising:
an access clearance device configured for providing a controlled access to the accommodation module, and for providing a controlled exit from the accommodation module.

7. The emergency exit hatch of claim 6,
wherein the access clearance device is selected from the group consisting of electronic keypad, mechanical keypad and electromechanical keypad.

8. The emergency exit hatch of claim 1, further comprising an element selected from the group consisting of steps, fold-out steps, seat backrests, seating surface, footboard, handle and handrail.

9. The emergency exit hatch of claim 1,
wherein the emergency exit hatch is configured for being arranged between a ceiling of a passenger area and a crown area.

10. A method for actuating an emergency exit hatch for exiting an accommodation module of an aircraft in an emergency and for entering the accommodation module, the exit hatch arranged in a floor of the accommodation module and configured for allowing an exit from the accommodation module through the floor thereof and into the passenger cabin or the cockpit and for allowing an entry into the accommodation module from the passenger cabin or the cockpit, the exit hatch comprising a first and a second mechanism, the method comprising:
actuating the first mechanism;
inspecting whether it is possible to actuate the second mechanism;
actuating the second mechanism to substantially completely open the emergency exit hatch;
wherein the first mechanism is not the same as the second mechanism, and
wherein the first mechanism is a mechanism selected from the group consisting of sliding mechanisms, sliding mechanisms with a rigid sliding unit, sliding mechanisms with several movable sliding units, sliding mechanisms with lamellae and sliding mechanisms with an individual rotatable blade.

11. The method of claim 10, further comprising:
lifting a handle on the exit hatch and disengaging a locking device of the exit hatch; and
engaging the locking device.

12. The method of claim 11, further comprising:
removing a decorative panel arranged adjacent to the exit hatch along a ceiling or a ceiling line of the aircraft, thereby allowing an exit from or an entry into the accommodation module.

13. The method of claim 11, further comprising:
utilizing an exiting or entering aid associated with the exit hatch, the exiting or entering aid selected from the group consisting of steps, fold-out steps, seat backrests, seating surfaces, footboards, handles and handrails.

14. The method of claim 11, further comprising:
actuating an access clearance device associated with the exit hatch, the access clearance device configured for providing a controlled access to the accommodation module, and
for providing a controlled exit from the accommodation module.

15. An accommodation module with an emergency exit hatch for an aircraft, the emergency exit hatch comprising:

a first mechanism for allowing visual inspection of an area underneath the emergency exit hatch by at least partially opening the emergency exit hatch with the aid of the first mechanism;
a second mechanism for substantially completely opening the emergency exit hatch;
wherein the first mechanism is not the same as the second mechanism; and
wherein the first mechanism is a mechanism selected from the group consisting of sliding mechanisms, sliding mechanisms with a rigid sliding unit, sliding mechanisms with several movable sliding units, sliding mechanisms with lamellae and sliding mechanisms with an individual rotatable blade; and
wherein the exit hatch is arranged in a floor of the accommodation module and is configured for allowing an exit from the accommodation module through the floor thereof and into a passenger cabin or a cockpit of the aircraft and for allowing an entry into the accommodation module from the passenger cabin or the cockpit.

* * * * *

UNITED STATES PATENT AND TRADEMARK OFFICE
CERTIFICATE OF CORRECTION

| | |
|---|---|
| PATENT NO. | : 8,328,137 B2 |
| APPLICATION NO. | : 12/740403 |
| DATED | : December 11, 2012 |
| INVENTOR(S) | : Thomas Sütthoff and Alexander Stendel |

It is certified that error appears in the above-identified patent and that said Letters Patent is hereby corrected as shown below:

On the title page item (60) replace "60/000,951" with --61/000,951--.

Signed and Sealed this
Fourteenth Day of January, 2014

Michelle K. Lee
*Deputy Director of the United States Patent and Trademark Office*

UNITED STATES PATENT AND TRADEMARK OFFICE
CERTIFICATE OF CORRECTION

PATENT NO.        : 8,328,137 B2
APPLICATION NO.   : 12/740403
DATED             : December 11, 2012
INVENTOR(S)       : Thomas Sütthoff and Alexander Stendel It is certified that error appears in the above-identified patent and that said Letters Patent is hereby corrected as shown below:

In the Claims

Claim 12, Column 14, Line 49 "11" should be replaced by --10--.

Claim 13, Column 14, Line 54 "11" should be replaced by --10--.

Claim 14, Column 14, Line 59 "11" should be replaced by --10--.

Signed and Sealed this
Second Day of September, 2014

Michelle K. Lee
*Deputy Director of the United States Patent and Trademark Office*